United States Patent [19]

Gerson et al.

[11] 4,451,885
[45] May 29, 1984

[54] BIT OPERATION METHOD AND CIRCUIT FOR MICROCOMPUTER

[75] Inventors: Isadore S. Gerson, Austin; Willard S. Briggs, Carrollton, both of Tex.

[73] Assignee: Mostek Corporation, Carrollton, Tex.

[21] Appl. No.: 353,602

[22] Filed: Mar. 1, 1982

[51] Int. Cl.³ .............................................. G06F 7/00
[52] U.S. Cl. ................................................... 364/200
[58] Field of Search ... 364/200 MS File, 900 MS File

[56] References Cited

U.S. PATENT DOCUMENTS

| 3,370,274 | 2/1968 | Kettley et al. | 364/200 |
| 3,510,846 | 5/1970 | Goldschmidt et al. | 364/900 |
| 4,085,447 | 4/1978 | Pertl et al. | 364/900 |

*Primary Examiner*—Thomas M. Heckler

[57] ABSTRACT

A microcomputer circuit is described for carrying out bit operations between registers and ports without the need for bit testing followed by branch operations. The microcomputer includes a bus (10) connected to provide communication to an ALU (22), registers (11, 12) and a serial port (13). A bit test circuit is connected to the bus (10) and provides a selected bit to a temporary carry storage (18) which in turn transfers the selected bit to a carry flag location (28a) within a status register (28). Instruction codes are input to an instruction register (32) which provides operating commands to an entry ROM (36) and an ALU control circuit (40). After a bit test operation is completed and in response to a copy or exchange instruction provided to the instruction register (32) a bit can be copied from one register to another register, bits can be exchanged between two registers or bits within a register can be parallel-to-serial converted and provided to the serial port (13). Each of these operations is carried out without the need for employing branch operations following the test of a bit. The present invention provides dynamic bit operations without the need for testing the state of a bit to determine conditional branching for selecting set or clear operations. With the present invention the speed of bit operations is improved and the amount of code stored in program memory can be reduced.

3 Claims, 2 Drawing Figures

BIT OPERATION METHOD AND CIRCUIT FOR MICROCOMPUTER

TECHNICAL FIELD

The present invention pertains to microcomputers and in particular to performing bit operations by microcomputers.

BACKGROUND OF THE INVENTION

Microcomputer applications frequently involve bit operations directed to reading or transferring one bit in an operand field. Examples of bit instructions which are typically used to accomplish these operations are set, clear and test. The conventional approach for numerous bit operations is as follows. A selected bit is tested to determine its state, one or zero. Next, a branch is taken to execute either a set or clear operation. However, these steps require the execution of a number of separate instruction codes to accomplish the required result. These numerous instruction codes consume excessive space in the limited memory available for a microcomputer. Further, the execution of these numerous instruction codes consumes time which is then not available for other purposes.

In view of the above limitations there exists a need for a microcomputer bit operation circuit for dynamically transferring a bit without regard to the state of the bit and without the need for branch operations.

SUMMARY OF THE INVENTION

A selected embodiment of the present invention is a bit operation method for a microcomputer which has an arithmetic logic unit (ALU) connected to communicate through a bus, the method including the steps of first loading a bit test instruction into an instruction register to carry out a bit test. A first operand is transferred from a first register to a bit test circuit. A first mask word is transferred from the instruction register to the bit test circuit and to the ALU. A bit is selected from the first operand by operation of the bit test circuit. The selected bit is transferred from the bit test circuit to a selected bit location. A bit copy instruction is next loaded into the instruction register. A second operand is transferred from a second register to the ALU. A second mask word is transferred to the ALU. The selected bit is transferred from the selected bit location to the ALU. By operation of the ALU and in accordance with the mask word the selected bit is entered into the second operand. Finally, the second operand, having the selected bit therein, is transferred from the ALU through the bus to the second register, thereby copying the selected bit from the first operand into the second operand in response to the bit copy instruction.

Further embodiments of the present invention include bit exchange between two registers and parallel-to-serial conversion between a first register and a serial port.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
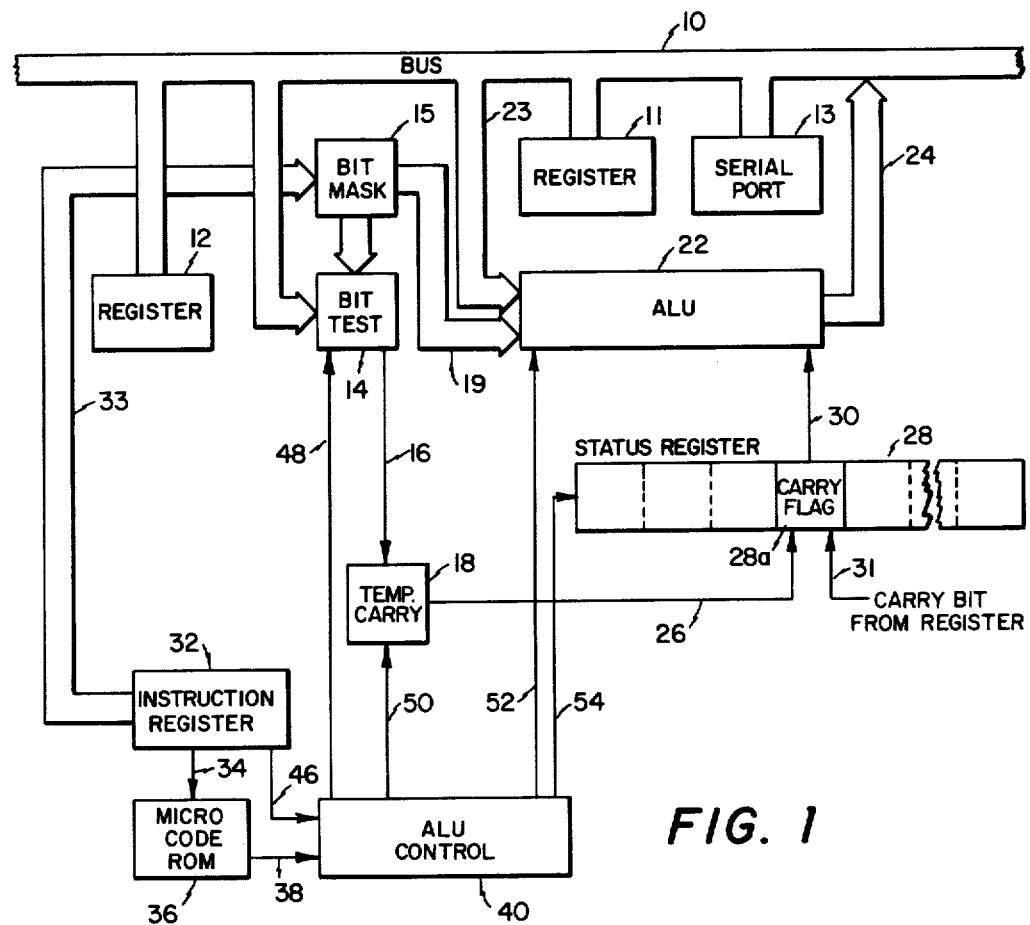
FIG. 1 is a block diagram illustrating the relationship of functional units within a microcomputer.

A selected number of functional units of a microcomputer are illustrated in FIG. 1 to show the operation of the present invention. A bus 10 carries both address and data information for parallel transfer between units of the microcomputer. The bus 10 is connected to numerous ports, functional units and registers such as registers 11 and 12 and serial port 13. The registers 11 and 12 and the port 13 can transmit and receive data through the bus 10.

A bit test circuit 14 is connected to receive an operand from the bus 10 and a mask word from a bit mask circuit 15. The use of the bit test circuit 14 produces a selected bit from the operand received from the bus 10. The selected bit is transmitted through a line 16 to a temporary carry storage 18. The mask word is also transmitted through a bus 19 to an arithmetic logic unit (ALU) 22. The ALU 22 is connected to receive data through a bus 23 and transmit data through a bus 24 to the bus 10.

The selected bit in the temporary carry storage 18 can be transmitted through a line 26 to a status register 28. Within the status register 28 there is a designated location 28a for storing a bit which is termed a carry flag bit. The selected bit in storage 18 can be shifted into the carry flag location. The carry flag bit can be transmitted through a line 30 to the ALU 22. Further, certain registers, such as 11, transfer an overflow bit, due to a shift, into the carry flag location through a line 31.

The microcomputer operations are controlled by a series of instruction codes which are sequentially executed to direct the operation of the functional units of the microcomputer. Each instruction code is loaded into an instruction register 32. The state of the various bits within the register 32 controls the operation of the microcomputer. A bus 33 transfers the mask word from the instruction register 32 to the bit mask circuit 15. A line 34 is connected between register 32 and a microcode read only memory (ROM) 36. The microcode ROM 36 generates microcode instructions which carry out specialized operations within the microcomputer. A control line 38 passes commands from the microcode ROM 36 to an ALU control 40. The ALU control 40 generates signals which cause operations to occur related to operation of the ALU 22. The control 40 also receives control signals directly from the instruction register 32 through a line 46.

The ALU control 40 generates control signals for various units of the microcomputer. These control signals are transmitted through a line 48 to the bit test circuit 14, through a line 50 to the temporary carry storage 18, through a line 52 to the ALU 22 and through a line 54 to the status register 28.

Figure 2:
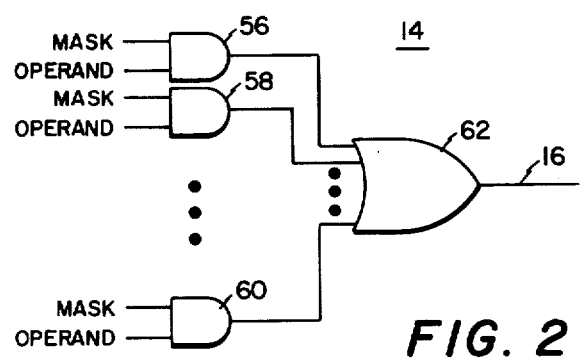
FIG. 2 is a schematic logic diagram for the bit test circuit shown in FIG. 1.

A detailed schematic of the bit test circuit 14 is illustrated in FIG. 2. Circuit 14 includes a plurality of two input AND gates including 56, 58 and 60. Each of the AND gates 56, 58 and 60 has two inputs. There is typically one AND gate for each of the lines of the bus 10. A mask word is input with one bit thereof to each of the AND gates with the second input receiving one bit of the operand which is provided to the bit test circuit 14. The outputs of the AND gates 56, 58 and 60 are input to an OR gate 62. The mask bits serve to blank all but a selected bit of the input operand such that the selected bit is generated at the output of the OR gate 62.

Operation of the present invention is now described in reference to FIGS. 1 and 2. The three bit operations to be described are copy, exchange and parallel-to-serial conversion.

A copy operation has as its object the moving of a selected bit from register 11 to register 12. A bit test is carried out as follows. A bit test instruction is loaded into the instruction register 32. A mask word is transferred from the instruction register 32 to the bit mask circuit 15 and the operand from register 11 is transferred to the bit test circuit 14. The mask word is input to bit test circuit 14. The resultant selected bit is passed through line 16 and the temporary carry storage 18 to the carry flag location 28a.

After the selected bit is stored in the carry flag location 28a, a bit copy instruction is loaded into register 32. The operand from register 12, along with a mask word from register 32, is then input to ALU 22. The stored bit at the carry flag location 28a is input to ALU 22 which inserts the carry flag bit into the operand as determined by the mask word in the ALU 22 and transfers the operand through bus 10 into register 12 thus completing the copy operation. Unlike the prior art procedures, this copy operation does not utilize any branch instructions.

The exchange operation comprises exchanging selected bits between two locations, such as registers 11 and 12, on the bus 10. First, a bit test instruction, with appropriate mask word, is loaded into the instruction register 32. The operand from register 11 and the mask word are input to the bit test circuit 14 to produce a register 11 operand selected bit which is passed through storage 18 to carry flag location 28a.

Next, the selected bit in register 12 and the carry flag bit are interchanged as follows. An exchange instruction is loaded into register 32. The register 12 operand and a mask word are input to the bit test circuit 14 to produce a register 12 operand selected bit which is stored in the temporary carry storage 18. The register 12 operand, mask word and carry flag bit are input to the ALU 22 to generate an operand having the carry flag bit inserted into the operand at the selected bit location determined by the mask word. This modified operand is then transferred into the register 12. Next, the register 12 selected bit is moved from storage 18 into the carry flag location 28a. In turn, the register 11 operand and a mask word are input to the ALU 22 together with the current carry flag bit from location 28a. The ALU 22 inserts the carry flag bit into the operand and transfers the modified operand to register 11 thus completing the bit exchange between registers 11 and 12 without using branch instructions.

Parallel-to-serial conversion can be used by a microcomputer to transmit a serial data stream through a serial port using data bits stored in a register. This can be applied in a USART function. As noted above, when selected registers, such as a data register, undergo a shift, the overflow bit is transferred to the carry flag location 28a to become the carry flag bit. A shift instruction is entered into register 32 to cause such a shift. Next a copy instruction is loaded into the instruction register 32. The ALU 22 receives an operand from a register which has a bit location dedicated to the serial port 13. The ALU 22 also receives a mask word and the carry flag bit to produce a new operand having the carry flag bit in the selected bit location determined by the mask word. The new operand is transmitted to the register which includes the serial port 13 bit where the carry flag is passed through the serial port. The register 11 is again shifted and the overflow bit is transferred to the carry flag location 28a and the above process is repeated until all the bits in the register being shifted are serially transmitted through port 13. The register can then be refilled to continue the serial transfer.

The present invention substantially reduces the number of instructions required to carry out the parallel-to-serial transfer of a fixed unit of data. This results in a faster operation as well as reducing the amount of code required to accomplish the desired application. This is important since the read only memory space in microcomputers is generally quite limited.

Although one embodiment of the invention has been illustrated in the accompanying Drawings and described in the foregoing Detailed Description, it will be understood that the invention is not limited to the embodiments disclosed, but is capable of numerous rearrangements, modifications and substitutions without departing from the scope of the invention.

We claim:

1. A bit operation method for a microcomputer which has an arithmetic logic unit (ALU) connected to communicate through a bus, the method comprising the steps of:
   (a) loading a bit test instruction into an instruction register,
   (b) transferring a first operand from a first register to a bit test circuit,
   (c) transferring a first mask word from said instruction register to said bit test circuit,
   (d) selecting a bit from said first operand by operation of said bit test circuit in accordance with said first mask word,
   (e) transferring said selected bit from said bit test circuit to a selected bit location,
   (f) loading a bit copy instruction into said instruction register to carry out a bit copy from said first operand to a second operand,
   (g) transferring said second operand from a second register to said ALU,
   (h) transferring a second mask word from said instruction register to said ALU,
   (i) transferring said selected bit from said bit location to said ALU,
   (j) entering said selected bit into said second operand in accordance with said second mask word by operation of said ALU, and
   (k) transferring said second operand, having said selected bit therein, from said ALU through said bus to said second register thereby copying said selected bit from said first operand to said second operand in response to said instruction.

2. A bit operation method for a microcomputer which has an arithmetic logic unit connected to communicate through a bus, the method comprising the steps of:
   (a) loading a bit test instruction into an instruction register,
   (b) transferring a first operand from a first register to a bit test circuit,
   (c) transferring a first mask word from said instruction register to said bit test circuit,
   (d) selecting a bit from said first operand by operation of said bit test circuit in accordance with said first mask word, (e) transferring said first operand selected bit from said bit test circuit to a first bit storage location, (f) loading a bit exchange instruction into said instruction register to carry out a bit exchange between said first operand and a second operand, (g) transferring a second operand from a second register to said bit test circuit and to said ALU, (h) transferring a second mask word from said instruction register to said bit test circuit and to said ALU, (i) selecting a bit from said second operand by operation of said bit test circuit in accordance with said second mask word, (j) transferring said second operand selected bit from said bit test circuit to a second bit storage location, (k) transferring said first operand bit from said first bit location to said ALU, (l) entering said first operand selected bit into said second operand by operation of said ALU, (m) transferring said second operand, having said first operand selected bit therein, from said ALU to said second register, (n) transferring said second operand selected bit from said second bit location to said first bit location, (o) transferring said first operand from said first register to said ALU, (p) transferring said second operand selected bit from said first location to said ALU, (q) entering said second operand selected bit into said first operand by operation of said ALU, and (r) transferring said second operand, having said first operand selected bit therein, from said ALU to said second register thereby completing said bit exchange between said first and said second operands.

3. A parallel-to-serial bit operation method for a microcomputer which has an arithmetic logic unit (ALU) connected to communicate through a bus, the method comprising the steps of:

(a) loading a shift instruction into an instruction register, (b) shifting the contents of a data register to produce an overflow bit, (c) transferring said overflow bit to a bit storage location, (d) loading a copy instruction into said instruction register to accomplish a serial transfer of a bit from said data register to a serial port, (e) transferring an operand from a selected register which includes a bit location dedicated to said serial port to said ALU, (f) transferring a mask word from said instruction register to said ALU, (g) transferring said overflow bit from said bit storage location to said ALU, (h) entering said overflow bit into said operand by operation of said ALU in accordance with said mask word, (i) transferring said operand, having said overflow bit entered therein, from said ALU through said bus to said selected register which includes a bit location dedicated to said serial port, (j) transmitting said overflow bit through said serial port, and (k) repeating steps (a) through (j) above to complete the parallel-to-serial conversion for the bits in said data register.

* * * * *